(No Model.)
H. L. MOULTON.
Bearing for Shafts.
No. 231,342. Patented Aug. 17, 1880.
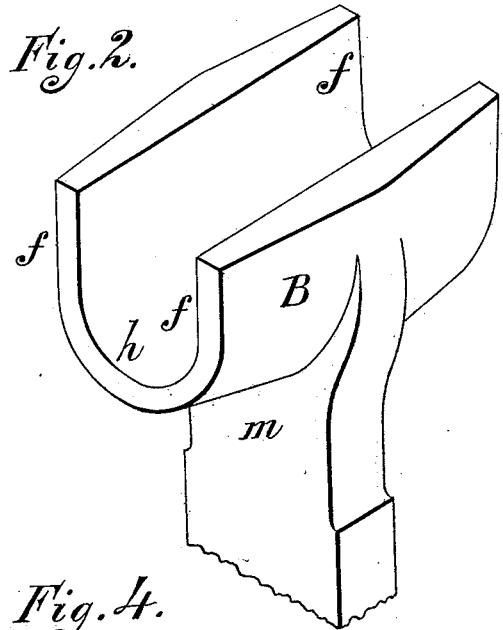
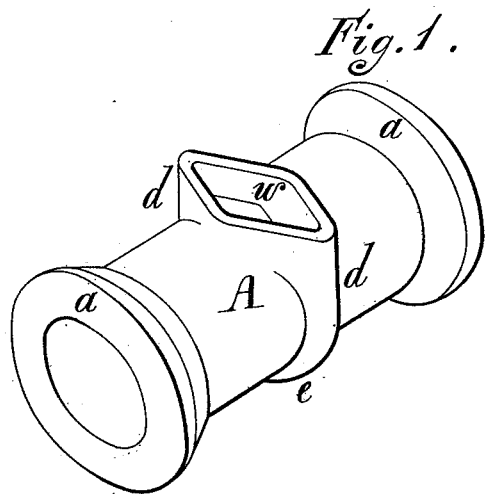
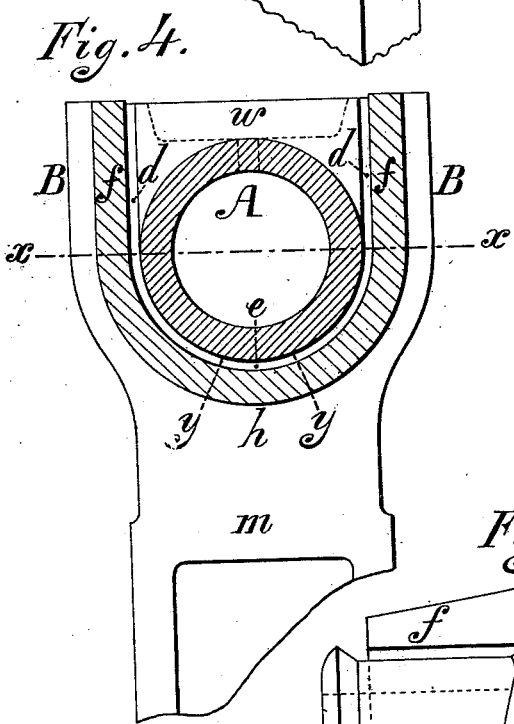
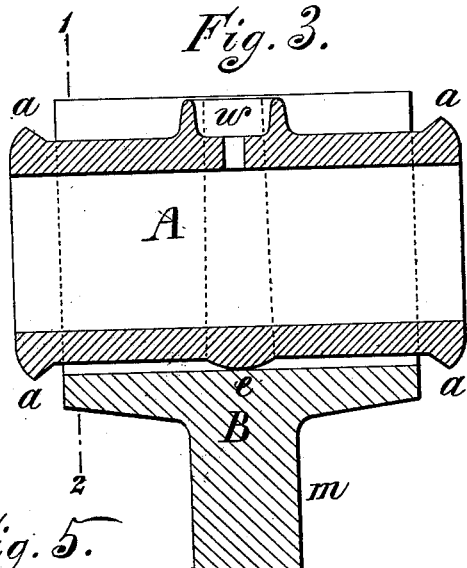
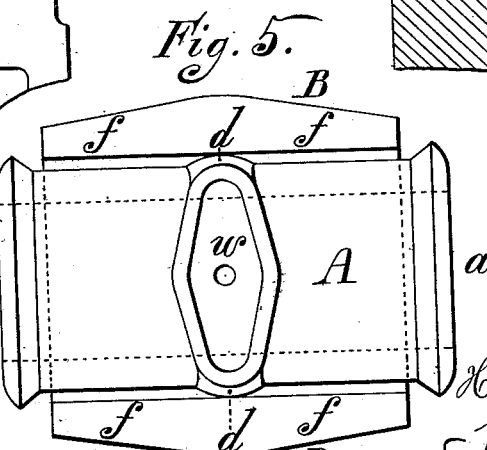
Witnesses:
Robert H. Hox
Harry Smith
Inventor:
Hamilton L. Moulton
by his Attorneys
Howson and Son

UNITED STATES PATENT OFFICE.

HAMILTON L. MOULTON, OF CAMDEN, NEW JERSEY, ASSIGNOR TO THE JAMES SMITH WOOLEN MACHINERY COMPANY, OF PHILADELPHIA, PA.

BEARING FOR SHAFTS.

SPECIFICATION forming part of Letters Patent No. 231,342, dated August 17, 1880.

Application filed July 15, 1880. (No model.)

*To all whom it may concern:*

Be it known that I, HAMILTON L. MOULTON, a citizen of the United States, residing in Camden, New Jersey, have invented Improvements in Bearings for Shafts, of which the following is a specification.

The object of my invention is to make a cheap and effective self-accommodating bearing for shafts; and this object I attain in the manner which I will now proceed to describe, reference being had to the accompanying drawings, in which—

Figure 1 is a perspective view of the improved bearing; Fig. 2, a perspective view of the socket which carries the said bearing; Fig. 3, a vertical section of the socket and bearing; Fig. 4, a section of Fig. 3 on the line 1 2, and Fig. 5 a plan view.

The bearing, a general view of which is shown in Fig. 1, and which is preferably made of cast-iron, consists of a hollow cylinder, A, having an annular flange or collar, $a$, at each end. Midway between the opposite ends of the cylinder there are cast on the same two straight vertical ribs, $d\ d$, one on each side, these ribs being parallel with each other from the top to the central line, $x$, Fig. 4, at which point they merge into the semicircular rib $e$, which is concentric with the cylinder. In other words, the rib $e$ is a semicircular continuation of the two straight ribs, and the ribs are rounded transversely throughout, as shown in Fig. 5. The ribs $d\ d$ are carried upward above the cylinder and merge into a transverse projection, $w$, which is recessed to form a receptacle for oil.

The socket B, the general form of which will be best understood by reference to the perspective view, Fig. 2, is, in the present instance, constructed for attachment to a carding-machine for carrying a bearing of the shaft of a worker or stripper, the bar $m$, which forms part of the socket, and portions of which are shown in Figs. 2, 3, and 4, being secured to and made adjustable on the side frame of the machine in a manner which need not be described, for the socket may form a part of any structure for carrying the bearing of any shaft. It may, for instance, form part of a hanger for line or counter shafts. The interior of the socket is perfectly plain throughout, and has opposite parallel sides $f\ f$, Fig. 2, merging into a semicircular bottom, $h$, which conforms with the semicircular rib $e$ of the bearing, the straight ribs $d\ d$ of which fit snugly to the straight sides of the socket, but in such a manner that the bearing can move freely therein.

It will be seen, on reference to Fig. 5, that while the bearing fits snugly between the straight sides of the socket it can be vibrated laterally therein to a limited extent, and on reference to Fig. 4 it will be observed that the bearing can be vibrated vertically, as the rib $e$ is the only portion which rests on the bottom of the socket; hence the bearing will readily accommodate itself to the journal of the shaft adapted to the bearing.

The distance between the flanges or collars $a\ a$ of the bearing is such in respect to the width of the socket that there shall be sufficient end play of the former on the latter to permit the bearing to move in the directions pointed out to the limited extent which the self-adjustment of the bearing to the journal may demand.

While the above-described freedom of the bearing in the socket is always assured, it cannot turn therein owing to the straight ribs $d\ d$ adapted to the straight sides of the socket, and it may be remarked that while these straight ribs are essential to my invention it is not necessary that the rib $e$ should be continued throughout one-half of the bearing. It may, for instance, be discontinued from $x$ to $y$ on both sides, thus leaving a central projection to rest on the bottom of the socket.

Different kinds of self-accommodating bearings have been devised and brought into practice, among them the well-known ball-and-socket bearing; but bearings of this class, as heretofore made, have always been adapted to sockets which required special and expensive tool-work to properly finish them, and which are difficult and costly to mold and cast; whereas my improved bearing is adapted to a socket which is perfectly plain throughout, can be easily cast, and requires nothing but ordinary cleansing to make it ready for receiving the bearing.

A flange, $a$, may be formed on the inner end of the bearing only, if desired, although it is preferable to form a flange on both ends of the bearing.

I claim as my invention—

1. The within-described bearing, consisting of a hollow cylinder provided with end flange or flanges, with opposite straight or parallel ribs d d, rounded transversely, and with a rounded rib or projection, c, all substantially as and for the purpose set forth.

2. The combination of the U-shaped socket, made plain throughout, with the bearing A, provided with ribs d d and c and flange or flanges a, and otherwise adapted to the socket, substantially as set forth.

In testimony whereof I have signed my name to this specification in the presence of two subscribing witnesses.

HAMILTON L. MOULTON.

Witnesses:
J. HENRY KNOWLES,
ADAM HIMELSPARK.